(12) United States Patent
Neet et al.

(10) Patent No.: US 10,014,755 B2
(45) Date of Patent: Jul. 3, 2018

(54) COMPONENT FOR AN ELECTRIC MACHINE

(71) Applicant: REMY TECHNOLOGIES, L.L.C., Pendleton, IN (US)

(72) Inventors: Kirk Neet, Pendleton, IN (US); David Maley, Anderson, IN (US); Scott Bitzer, Fishers, IN (US); Chad Zook, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/236,929

(22) Filed: Aug. 15, 2016

(65) Prior Publication Data

US 2016/0352196 A1   Dec. 1, 2016

Related U.S. Application Data

(62) Division of application No. 14/021,797, filed on Sep. 9, 2013, now Pat. No. 9,502,944.

(51) Int. Cl.
*H02K 1/24* (2006.01)
*H02K 7/14* (2006.01)
*H02K 9/06* (2006.01)
*H02K 15/02* (2006.01)

(52) U.S. Cl.
CPC ........... *H02K 15/022* (2013.01); *H02K 1/243* (2013.01); *H02K 7/14* (2013.01); *H02K 9/06* (2013.01)

(58) Field of Classification Search
CPC ...... H02K 15/022; H02K 15/024; H02K 7/14; H02K 1/243; H02K 9/06; Y10T 29/49934; Y10T 29/49936; Y10T 29/49938

USPC .......... 29/521, 522.1; 310/60 R, 62, 156.66, 310/263

See application file for complete search history.

(56) References Cited

U.S. PATENT DOCUMENTS

| 2,581,872 | A | 1/1952 | Morrison |
| 2,588,175 | A | 3/1952 | Stewart et al. |
| 2,654,529 | A | 10/1953 | Smith |
| 4,686,399 | A | 8/1987 | Imori et al. |
| 4,826,405 | A | 5/1989 | Robb |
| 4,961,016 | A | 10/1990 | Peng et al. |
| 5,693,992 | A | 12/1997 | Kurusu et al. |
| 5,944,497 | A | 8/1999 | Kershaw et al. |

(Continued)

FOREIGN PATENT DOCUMENTS

CN    101162021 A    4/2008

OTHER PUBLICATIONS

International Search Report and Written Opinion for PCT Application No. PCT/US2014/038045, dated Sep. 12, 2014, pp. 1-11.

(Continued)

*Primary Examiner* — Bayan Salone
(74) *Attorney, Agent, or Firm* — Cantor Colburn LLP

(57) ABSTRACT

A method of securing a fan member to a rotor assembly of an electric machine. The method includes positioning the fan member adjacent the rotor, aligning at least two mounting members extending radially outwardly of the central hub of the rotor assembly with a corresponding at least two mounting elements extending radially inwardly of a hub portion of the fan member, and securing the at least two mounting members to the corresponding at least two mounting elements.

10 Claims, 5 Drawing Sheets

(56) References Cited

U.S. PATENT DOCUMENTS

| | | | |
|---|---|---|---|
| 6,462,440 B1 | 10/2002 | Asao et al. | |
| 6,707,181 B1 | 3/2004 | Militello et al. | |
| 7,057,315 B2* | 6/2006 | Ishida | F04D 29/282 |
| | | | 310/232 |
| 7,358,630 B2 | 4/2008 | Vasilescu et al. | |
| 7,365,471 B2* | 4/2008 | Creviston | H02K 9/06 |
| | | | 310/263 |
| 7,385,322 B2 | 6/2008 | Park | |
| 7,598,636 B2* | 10/2009 | Nakamura | H02K 9/06 |
| | | | 310/60 R |
| 8,684,676 B1 | 4/2014 | Kirkpatrick | |
| 8,847,446 B2 | 9/2014 | Maley | |
| 9,022,753 B2* | 5/2015 | Streng | F04D 25/082 |
| | | | 417/366 |
| 9,109,605 B2* | 8/2015 | Chou | F04D 29/023 |
| 9,502,944 B2* | 11/2016 | Neet | H02K 9/06 |
| 9,537,373 B2* | 1/2017 | Bledsoe | H02K 9/06 |
| 9,634,545 B2* | 4/2017 | Neet | H02K 9/06 |
| 2002/0076341 A1 | 6/2002 | Morelli | |
| 2003/0042806 A1 | 3/2003 | Inaba et al. | |
| 2005/0285459 A1 | 12/2005 | Ishida et al. | |
| 2006/0250033 A1 | 11/2006 | Vasilescu et al. | |
| 2007/0024131 A1 | 2/2007 | Rouleau et al. | |
| 2009/0039719 A1* | 2/2009 | Nakamura | H02K 9/06 |
| | | | 310/62 |
| 2011/0229358 A1 | 9/2011 | Streng et al. | |
| 2011/0316369 A1* | 12/2011 | Neet | H02K 9/06 |
| | | | 310/62 |
| 2013/0113312 A1 | 5/2013 | Maley | |
| 2013/0280086 A1 | 10/2013 | Chou | |
| 2014/0339964 A1 | 11/2014 | Bledsoe et al. | |
| 2015/0069883 A1* | 3/2015 | Neet | H02K 9/06 |
| | | | 310/60 R |
| 2015/0069884 A1* | 3/2015 | Neet | H02K 9/06 |
| | | | 310/60 R |

OTHER PUBLICATIONS

Office Action dated Apr. 28, 2016 in related Korean Patent Application No. 10-2015-0030753, 9 pages.

\* cited by examiner

COMPONENT FOR AN ELECTRIC MACHINE

CROSS-REFERENCE TO RELATED APPLICATIONS

This application is a divisional of U.S. patent application Ser. No. 14/021,797, which was filed on Sep. 9, 2013. The entire contents of U.S. patent application Ser. No. 14/021,797 are incorporated herein by reference.

BACKGROUND OF THE INVENTION

Exemplary embodiments pertain to the art of electric machines and, more particularly, to a component for an electric machine.

Many electric machines include a stator and a rotor that are shifted relative to one another to create an electromotive force. In many cases, a fan is mounted relative to the rotor. In operation, the rotor spins the fan which, in turn, provides a cooling airflow to the electric machine. At present, the particular mounting of the fan to the rotor creates limitations on electric machine size. More specifically, mounting the fan to the rotor requires certain mounting structures on both components. As electric machines become smaller, pulleys and other components are mounted closer to the rotor. The particular structure required for mounting the fan limits the distance that the pulley, or other such components, can be mounted relative to the rotor.

BRIEF DESCRIPTION OF THE INVENTION

Disclosed is a method of securing a fan member to a rotor assembly of an electric machine. The method includes positioning the fan member adjacent the rotor, aligning at least two mounting members extending radially outwardly of the central hub of the rotor assembly with a corresponding at least two mounting elements extending radially inwardly of a hub portion of the fan member, and securing the at least two mounting members to the corresponding at least two mounting elements.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
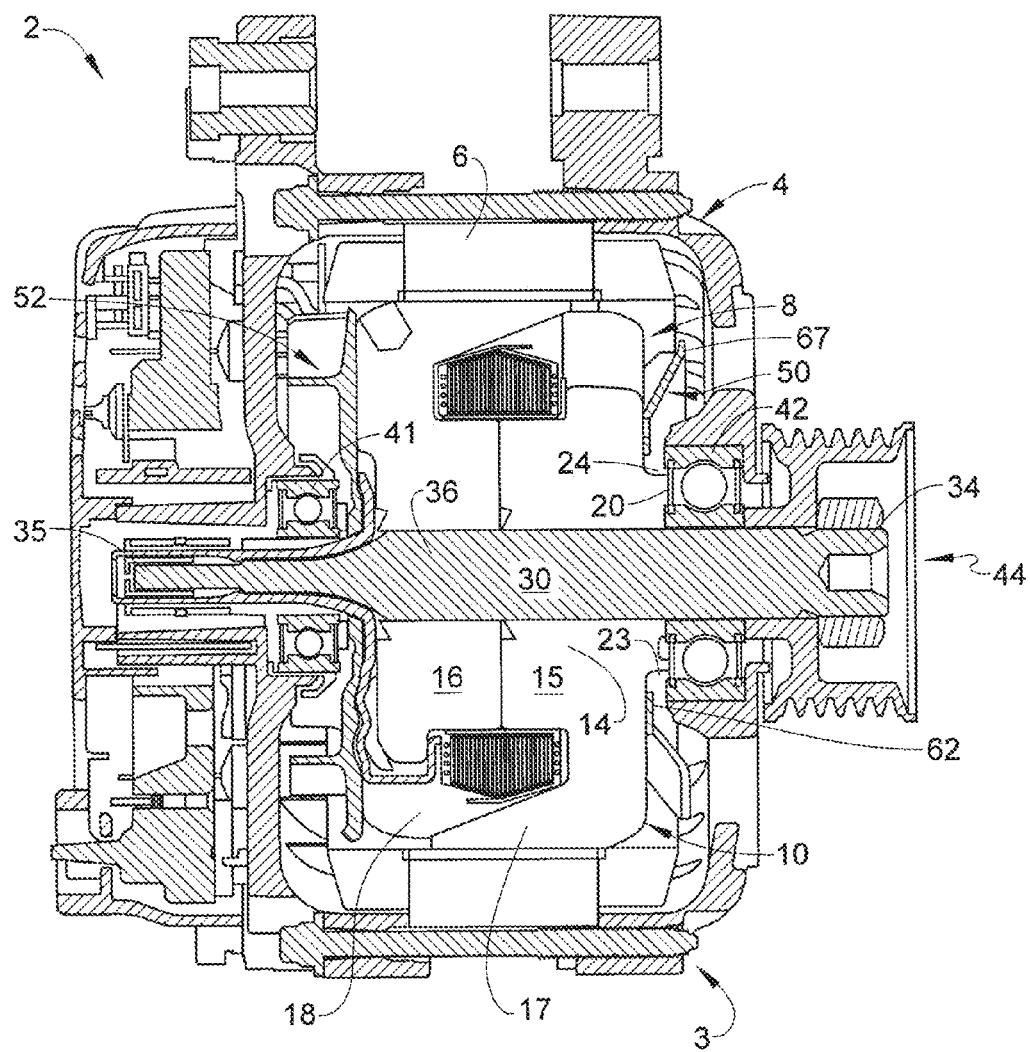
FIG. 1 depicts an electric machine including a rotor assembly and a fan member, in accordance with an exemplary embodiment.
Figure 2:
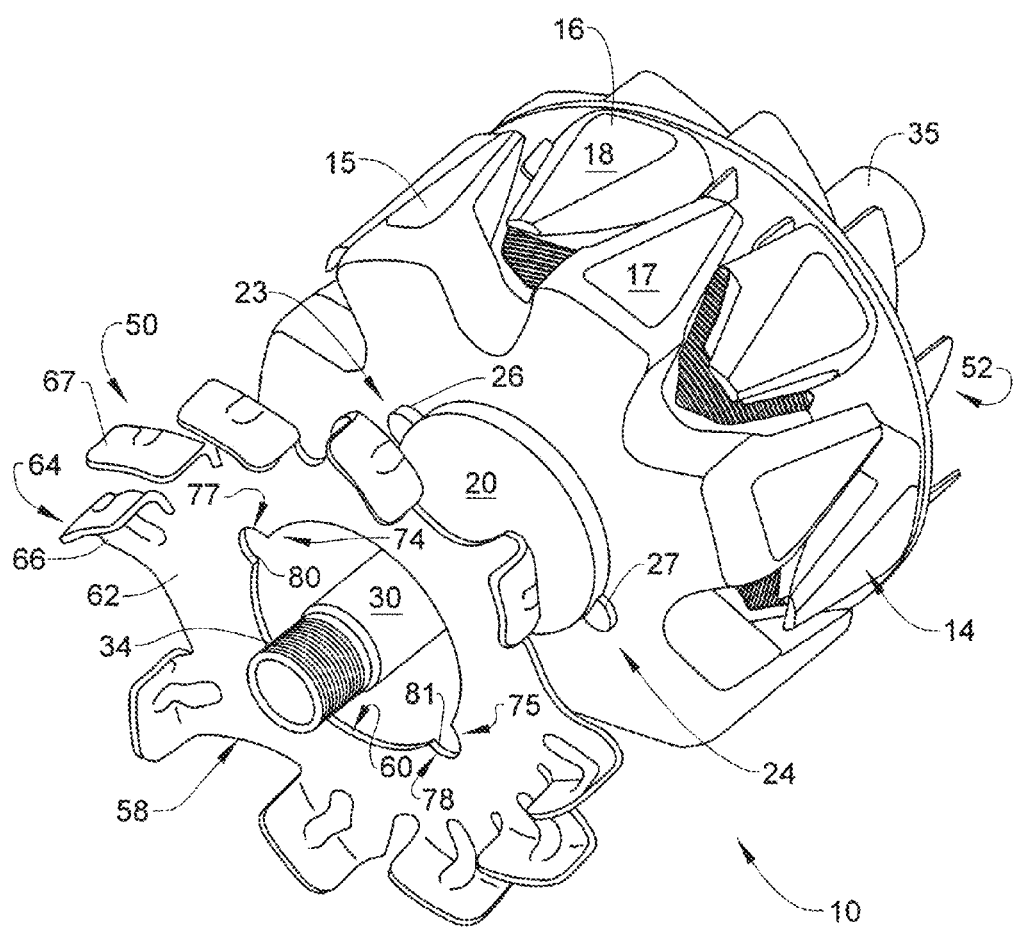
FIG. 2 depicts a partially disassembled perspective view of the rotor assembly and fan member of FIG. 1.
Figure 3:
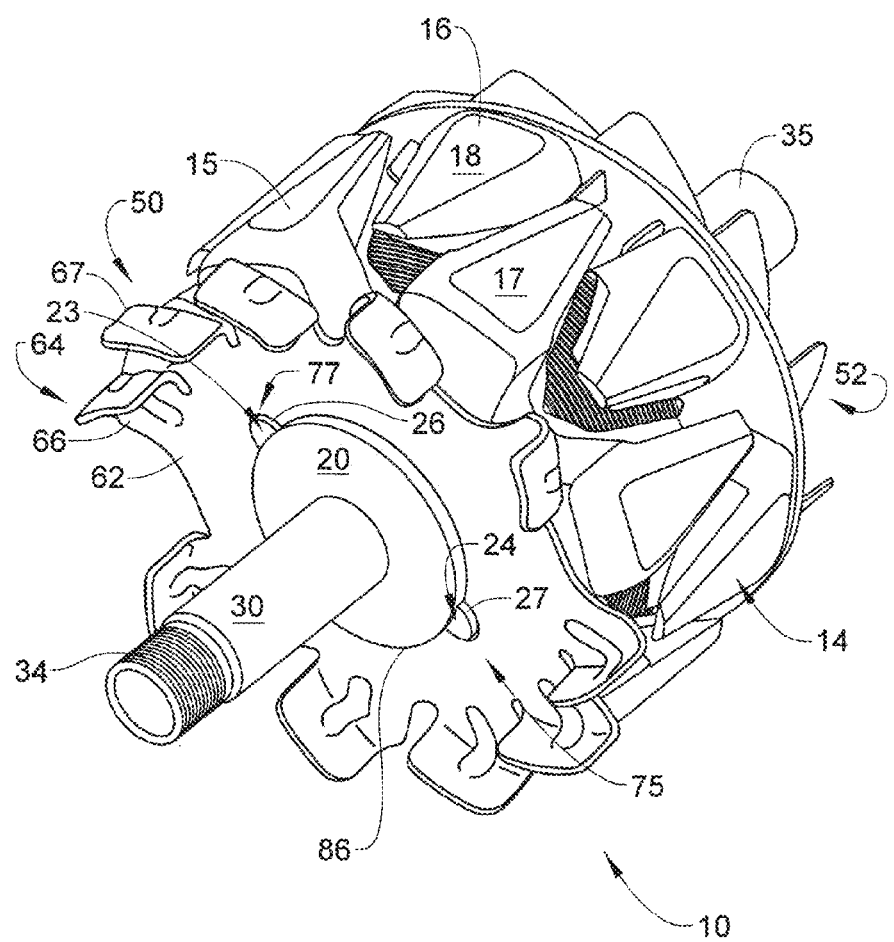
FIG. 3 depicts an assembled perspective view of the rotor assembly and fan member of FIG. 2.

With reference to FIGS. 1-3, an electric machine, constructed in accordance with an exemplary embodiment, is indicated generally at 2. Electric machine 2 is shown in the form of an alternator 3 and includes a housing 4 within which is arranged a stator 6 and a rotor assembly 8. Rotor assembly 8 rotates relative to stator 6 and includes a rotor 10 having a body 14. Body 14 includes a first half or claw pole portion 15 and a second half or claw pole portion 16. Each claw pole portion 15 and 16 includes a corresponding plurality of pole members, one of which is indicated at 17, on first claw pole portion 15 and at 18 on second claw pole portion 16. In the exemplary embodiment shown, the plurality of pole members 17 on first claw pole portion 15 represents half of a total number of pole members for rotor 10 and the plurality of pole members 18 on second claw pole portion 16 represents another half of the total number of pole members of rotor 10.

Rotor 10 includes a central hub 20 and a first projection or mounting member 23 and a second projection or mounting member 24. In the exemplary embodiment shown, first mounting member 23 is arranged substantially directly opposite to second mounting member 24. As will become more fully evident below, first and second mounting members 23 and 24 extend radially outwardly from central hub 20. First and second mounting members 23 and 24 project axially outwardly from first claw pole portion 15 and may include curvilinear outer sides 26 and 27 respectively. It should be evident to those skilled in the art that the shape of the mounting members 23 and 24 may take other forms including rectangular, triangular and the like. Mounting members 23 and 24 may also take the form of a slight radial bulge. Mounting members 23 and 24 extend from first claw pole portion 15 and may terminate prior to an outer edge (not separately labeled) of central hub 20, may extend beyond the outer edge of central hub 20, or may be coplanar with the outer edge of central hub 20.

In the exemplary embodiment shown, curvilinear outer sides 26 and 27 are substantially semi-circular. Rotor 10 is also shown to include a shaft 30 that extends through first and second claw pole portions 15 and 16. Shaft 30 extends from a first end 34 to a second end 35 through an intermediate portion 36. Intermediate portion 36 is rotatably supported to housing 4 by first and second bearings 41 and 42. A sheave or pulley 44 is mounted to first end 34 of shaft 30. Pulley 44 is configured to drive or be driven by a belt (not shown). Rotor 10 is further shown to include a fan member 50 arranged adjacent first claw pole portion 15 and a fan component 52 arranged adjacent second claw pole portion 16. Fan member 50 and fan component 52 are configured to generate a cooling air flow through housing 4.

In accordance with an exemplary embodiment, fan member 50 includes a body portion 58 having a hub portion 60 that is surrounded by a substantially planar portion 62. Fan member 50 includes a plurality of fan blades, one of which is indicated at 64, that projects radially outwardly from body portion 58. Each fan blade 64 includes a first portion 66 and a second portion 67. Second portion 67 is angled relative to first portion 66. Fan member 50 includes a first mounting element 74 and a second mounting element 75. Mounting elements 74 and 75 take the form of first and second notches 77 and 78 respectively. Each notch 77 and 78 extends radially outwardly from hub portion 60 into substantially planar portion 62. Each notch 77 and 78 includes a corresponding discontinuous edge 80 and 81 that create respective interruptions (not separately labeled) in hub portion 60. In the exemplary embodiment shown, first and second discontinuous edges 80 and 80 are curvilinear. In accordance with an aspect of the exemplary embodiment, first and second discontinuous edges 80 and 81 are substantially semi-circular.

In this manner, fan member 50 is positioned at first claw pole portion 15 such that hub portion 60 registers with central hub 20. In accordance with an aspect of the exemplary embodiment, a gap 86 is arranged between central hub 20 and hub portion 60 when fan member 50 is in place. Gap 86 establishes a moat that traps any varnish that might be present on rotor 10. That is, gap 86 inhibits varnish from migrating into central hub 20 or along shaft 30 which could create a loose fit at bearing 42 or at pulley 44. First and second mounting elements 74 and 75 are receptive of first and second mounting members 23 and 24. Mounting members 23 and 24 constrain radial movement of fan member 50 relative to first claw pole portion 15. Once in position, first and second mounting members 23 and 24 are staked by applying a force to the mounting members 23 and 24. Staking results in an outward expansion of first and second mounting members 23 and 24 that creates a mechanical bond with fan member 50. The mechanical bond causes the fan member 50 to be axially constrained relative to first claw portion 15.

Figure 4:
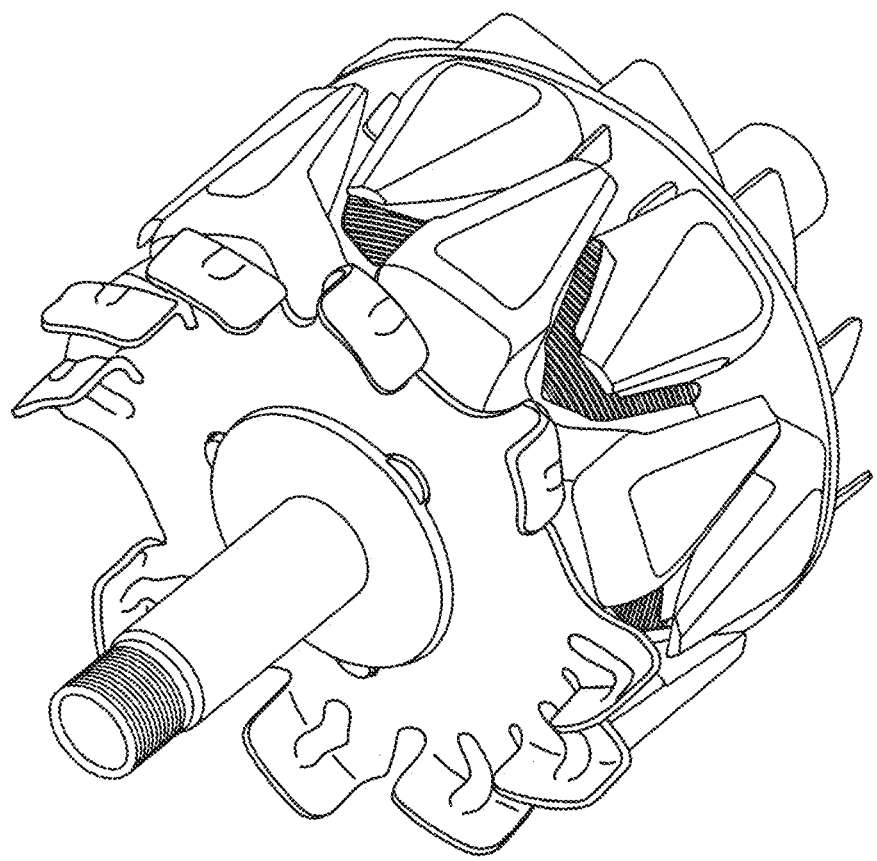
FIG. 4 depicts an assembled perspective view of a rotor assembly and fan member, in accordance with another aspect of the exemplary embodiment.
Figure 5:
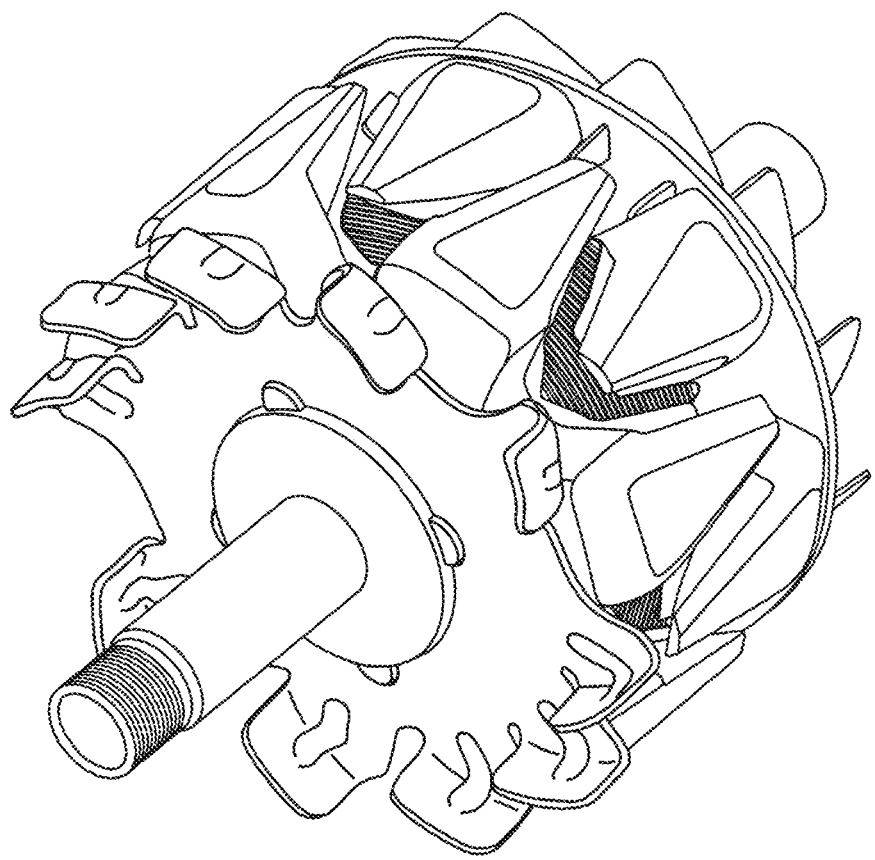
FIG. 5 depicts an assembled perspective view of a rotor assembly and fan member, in accordance with yet another aspect of the exemplary embodiment.

At this point it should be apparent that by forming the mounting members into the central hub, tooling and production costs can be reduced. Further, by forming the mounting members at the central hub, the number and size of connection points can be reduced. It should also be understood that the number and location of mounting members and corresponding mounting elements can vary. FIG. 4 shows an electric machine with three mounting elements and three mounting members; FIG. 5 shows an electric machine with four mounting elements and four mounting members. By minimizing the number of connections between the fan member and the rotor, and by eliminating raised portions about the connection zones, the rotor assembly has a shorter axial dimension. The shorter axial dimension enables electric machine 2 to be formed having a more compact form factor.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of securing a fan member to a rotor assembly of an electric machine, the method comprising:
    positioning the fan member adjacent the rotor assembly;
    aligning at least two mounting members extending radially outwardly of a central hub of the rotor assembly with a corresponding at least two mounting elements extending radially inwardly of a hub portion of the fan member; and
    securing the at least two mounting members to the corresponding at least two mounting elements.

2. The method of claim 1, further comprising: establishing a gap between the hub portion and the central hub.

3. The method of claim 2, further comprising: maintaining the gap after joining the fan member with the rotor assembly.

4. The method of claim 1, wherein securing the at least two mounting members to the corresponding at least two mounting elements comprises staking the at least two mounting members to the fan member.

5. The method of claim 1, wherein aligning the at least two mounting members with the corresponding at least two mounting elements comprises aligning at least three mounting members with at least three mounting elements.

6. The method of claim 1, wherein aligning the at least two mounting members with the corresponding at least two mounting elements comprises aligning at least two projections extending outwardly of the central hub with a corresponding at least two notches formed in the fan member.

7. The method of claim 6, wherein aligning the at least two projections extending outwardly of the central hub with the corresponding at least two notches formed in the fan member comprises aligning the at least two projections with a corresponding at least two notches each having a discontinuous edge formed in the hub portion.

8. The method of claim 7, wherein aligning the at least two projections with the corresponding at least two notches each having a discontinuous edge formed in the hub portion comprises aligning the at least two projections with a corresponding at least two notches having a curvilinear outer side.

9. The method of claim 8, wherein aligning the at least two projections with the corresponding at least two notches having a curvilinear edge comprises aligning the at least two projections with the corresponding at least two notches having a semi-circular outer side.

10. The method of claim 1, wherein aligning the at least two mounting members with the corresponding at least two mounting elements comprises aligning at least four mounting members with a corresponding at least four mounting elements.

\* \* \* \* \*